(12) United States Patent  
Lee

(10) Patent No.: US 8,830,603 B2
(45) Date of Patent: Sep. 9, 2014

(54) ELECTROMAGNETIC DRIVING DEVICE FOR LENS HAVING AN ANTI-TILT MECHANISM

(75) Inventor: Jin Yu Lee, Tainan (TW)

(73) Assignee: TDK Taiwan Corp., Taiwan (*) Notice: Subject to any disclaimer, the term of this patent is extended or adjusted under 35 U.S.C. 154(b) by 28 days.

(21) Appl. No.: 13/598,183

(22) Filed: Aug. 29, 2012

(65) Prior Publication Data

US 2013/0258506 A1 Oct. 3, 2013

(30) Foreign Application Priority Data

Apr. 3, 2012 (TW) .............................. 101111883 A

(51) Int. Cl.
*G02B 7/02* (2006.01)
(52) U.S. Cl.
USPC .......................................................... 359/824
(58) Field of Classification Search
USPC .......................................................... 359/824
See application file for complete search history.

(56) References Cited

U.S. PATENT DOCUMENTS

2013/0064535 A1* 3/2013 Hu ................................ 396/133

* cited by examiner

*Primary Examiner* — James Jones

(57) ABSTRACT

An electromagnetic driving device defined with an X axis, a Y axis and a Z axis includes a casing, a base, a driven object, an anti-tilt mechanism and an electromagnetic driving module. The electromagnetic driving module includes at least one magnetic member and at least one coil. The base connects to the casing so as to form an inner compartment thereinside. The driven object is received and movable along the Z axis inside the inner compartment. The magnetic member fixed to the driven object can be driven by magnetic forcing generated by the respective coil fixed to the casing. With the anti-tilt mechanism to provide lateral pressing forcing to eliminate possible gap between components connecting the driven object and the casing while the driven object is moved along the Z axis inside the inner compartment, possible dynamic tilt of the moving driven object can then be diminished.

12 Claims, 19 Drawing Sheets

FIG. 6    B-B section

A-A section

A-A section

ELECTROMAGNETIC DRIVING DEVICE FOR LENS HAVING AN ANTI-TILT MECHANISM

BACKGROUND OF INVENTION

1. Field of the Invention

The invention relates to an electromagnetic driving device for lens having an anti-tilt mechanism, in which the anti-tilt mechanism can correct possible sideward tilt of the lens while in operation so as to stabilize a smooth movement of the lens.

2. Description of the Prior Art

Please refer to FIG. 1, in which a conventional zooming or focusing lens module is explodedly shown. In this conventional design, a mechanical transmission zooming mechanism 9 is utilized. The mechanism 9 uses a high-cost precision driving element 91 as its source power for a carrier 93 of the lens module 92 and a lot more transmission elements are involved in the mechanism 9. In the art, the aforesaid high-cost precision driving element 91 can be a step motor, a supersonic motor, a piezoelectric actuator, and so on. Obvious disadvantages of such a mechanism 9 can be seen and well known in complicated structuring, tedious and difficult assembling, substantial occupation and high cost. Also, the mechanism 9 consumes a lot of energy during the operation.

In the early stage, the photography is quite professional, which involves manual photo detecting, manual focusing or zooming, and also manual reeling. Such a human-dependent art causes problems for green hands. In particular, while in a historical and un-repeated scene, a good timing for photography is usually missed for those ill-experienced photographers. Then, in 50's and 60's, machinery automation came in and made people believe that the automation would greatly change aspects in various consumer machineries. In the art of photography, the appearance of the auto photo detecting technique and the electrical reeling mechanism had proven that automation in photography was also possible. At that time, the red-hot auto-focusing system that led to a history-high photo-capturing speed was one of the flags for almost all the renowned camera manufacturers in the world.

Recently, it can be seen that the art of photography gears is focused in providing high-resolution images and, on the other hand, in providing a miniaturized design featuring in light weight, thin thickness, and handful size. It is clear that, in the era of having the camera as one of popular 3C products for ordinary amateur people, the cumbersome zooming lens module driven mechanically by the step-motor is now an obstacle for further miniaturizing the camera products.

At the same time, to replace the conventional step motor and to aim at reducing the volume of the driving mechanism of the lens module, an electronic VCM (Voice coil motor) feedback system is introduced to control the movement of the coils for the lens module. Also, integration work among various 3C products for enhancing the visual functions is also prosperous. Such work includes one of integrating the image-capturing function to the mobile communication product (for example, a cellular phone), the personal digital assistant (PDA), and/or the notebook computer.

Nevertheless, operations of all the above-mentioned portable products are limited to their own battery capacities. Hence, a topic and/or a research in providing the zooming or focusing lens module a new driving device that can feature in energy conservation while in operation and also in locating the lens module at a preferable position after the operation (i.e. the electricity supply) is ended is definitely crucially to the art.

Furthermore, in all conventional driving devices for lens module, a guide mechanism is used to regulate linear back-and-forth movement of the lens module along a predetermined direction. To avoid possible jams or ragged movement of the lens module, appropriate tolerance (i.e. spacing) are inevitable between the movable parts and the stationery parts (for example the axial hole and the axial shaft). However, such spacing lead to a tilt problem for the lens module, both in movement and in stops. Also, the spacing would affect the linearity and repeatability (for example, in the straightness and angles of the photo axis) in positions along the photo axis of the lens module. In particular, while the tolerance, the straightness, or the surface coarseness in holes is beyond the acceptable values, the image quality of the lens module and/or the precision positioning of the moving lens can be degraded. Apparently, improvement for the aforesaid shortcomings upon the lens module is definitely welcome to the art.

SUMMARY OF THE INVENTION

Accordingly, it is the primary object of the present invention to provide an electromagnetic driving device for lens having an anti-tilt mechanism, in which the anti-tilt mechanism is used to further cancel off possible tilt of the driven parts during the movement. Thereby, spacing variance caused by the surface unevenness of the guide mechanism between the lens carrier and the casing can be substantially reduced, the straightness of the moving lens as well as the perpendicularity of the photo axial can be assured, the stability in displacement control can be increased, and also precision positioning for the moving lens can be achieved.

In the present invention, the electromagnetic driving device for lens having an anti-tilt mechanism defined with an X axis, a Y axis and a Z axis comprises a casing, a base, a driven object (e.g., a lens module), an anti-tilt mechanism and an electromagnetic driving module. The electromagnetic driving module includes at least one magnetic member and at least one coil.

The base connects to the casing so as to form an inner compartment therein. The driven object is received and movable along the Z axis inside the compartment. The anti-tilt mechanism is to provide a lateral horizontal push or pull on an X-Y surface to the driven object so as to restrain the horizontal or rotational movement of the driven object, and thereby the X-axial and/or Y-axial gap or spacing around the driven object inside the compartment can be eliminated. The magnetic member is fixed to the driven object and can be driven by magnetic forces generated by the coil which is fixed to the casing at a location corresponding to the magnetic member. By a predetermined sideward force provided by the anti-tilt mechanism, possible tilt caused by the gap or spacing between the driven object and the casing when the driven object is driven to move along the Z axis inside the compartment will be eliminated.

All these objects are achieved by the electromagnetic driving device for lens having an anti-tilt mechanism described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
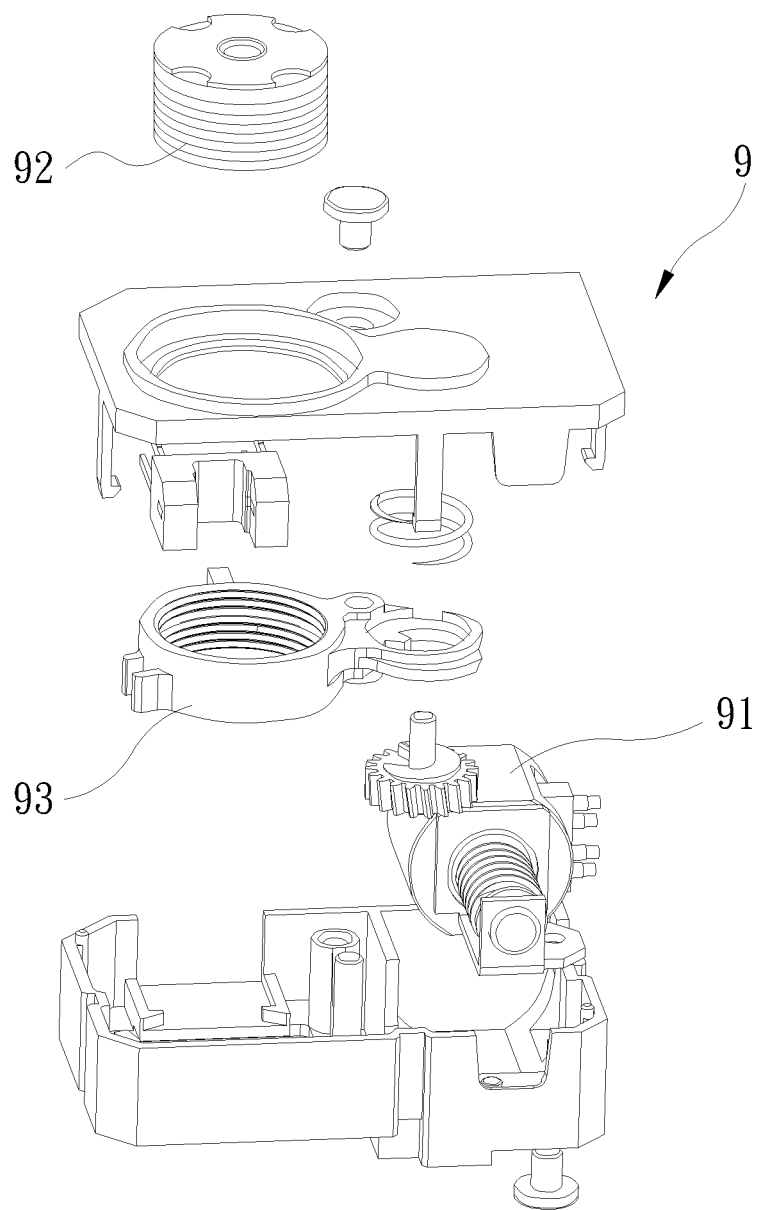
FIG. 1 is a schematic exploded view of a conventional zooming lens module.

The invention disclosed herein is directed to an electromagnetic driving device for lens having an anti-tilt mechanism. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Referring now to FIG. 2, FIG. 3, FIG. 4, FIG. 5, FIG. 6 and FIG. 7, an exploded view, a top view, a left-hand side view, a cross-sectional view along line A-A, a cross-sectional view along line B-B and a cross-sectional view along line C-C of a first embodiment of the electromagnetic driving device 1 for lens having an anti-tilt mechanism are shown, respectively. The electromagnetic driving device 1 defined with an X axis, a Y axis and a Z axis includes a casing 11, a base 12, a driven object 13, an anti-tilt mechanism 14, an electromagnetic driving module 15, a position-detecting module 16 and a guide mechanism 17. The casing 11 connects to the base 12 so as to form an inner compartment 110 therein. The driven object 13 inside the compartment 110 is received and movable along the Z axis.

In the first embodiment as shown, the driven object 13 can be a lens module. The lens module 13 further includes a lens carrier 131 and a lens 132. The lens 132 located at a center of the lens carrier 131 is moved synchronically with the lens carrier 131. The anti-tilt mechanism 14 is to provide a lateral horizontal push or pull on an X-Y surface to the driven object 13 so as to restrain the horizontal or rotational movement of the driven object 13, and thereby the X-axial and/or Y-axial gap, backlash or spacing around the driven object inside the compartment 110 can be eliminated. The anti-tilt mechanism 14 further includes a first guide-groove 141 located at the rim of the lens carrier 131 of the lens module 13, a constraint block 142 protruding upward from the base 12, and a rolling member 143. The rolling member 143 is restrained to move inside the longitudinal space formed between the first guide-groove 141 and a central portion of the constraint block 142, in which the longitudinal space is parallel to the Z axis; i.e., both the first guide-groove 141 and the constraint block 142 are extended in a direction parallel to the Z axis. The electromagnetic driving module 15 includes at least a magnetic member 151 and at least a coil 152. The position-detecting module 16 further includes a position detector 161 and a permanent magnet 162. In this embodiment, the position detector 161 can be a magneto-resistive sensor (a Hall element for example) having a fixed end mounted to the casing 11 and being located at a position with respect to the permanent magnet 162 engaged exteriorly with the lens carrier 131. The displacement of the lens module 13 inside the inner compartment 110 is detected by the position detector 161.

In another embodiment of the present invention not shown herein, the position detector 161 as a magneto-resistive sensor (a Hall element for example) can also be located respectively to one of the magnetic members 151. Thereupon, the displacement or position of the lens module 13 can be detected by the changes of the surrounding magnetic field.

In addition, in a further embodiment of the present invention (also not shown herein), the position detector 161 can be an optical position sensor (a photo-sensing resistive transmitter for example). In this embodiment, the optical position detector (i.e., the position detector 161) is located exteriorly to the lens carrier 131 (or inside the casing 11), and a reflector is located to an opposite side inside the casing 11 (or the lens carrier 131) with respect to the optical position detector (the position detector 161). Upon such an arrangement, the displacement or position of the lens module 13 can also be detected.

As shown, the casing 11 is a hollow cover having a central penetration hole 111. The casing 11 is to cover and thus engage by pairing with the base 12, so as to form the inner compartment 110 thereinside to accommodate the lens module 13 in between. A predetermined position inside the casing 11 is provided to locate one of the coils 152. As shown, the coil 152 is located at a position at the same side of the lens module 13 respectively to the corresponding magnetic member 151 which is exteriorly mounted to the lens module 13 and is located between the corresponding coil 152 and the lens module 13. In particular, the lens module 13 inside the inner compartment 110 is to capture the image through the central penetration hole 111.

Figure 2:
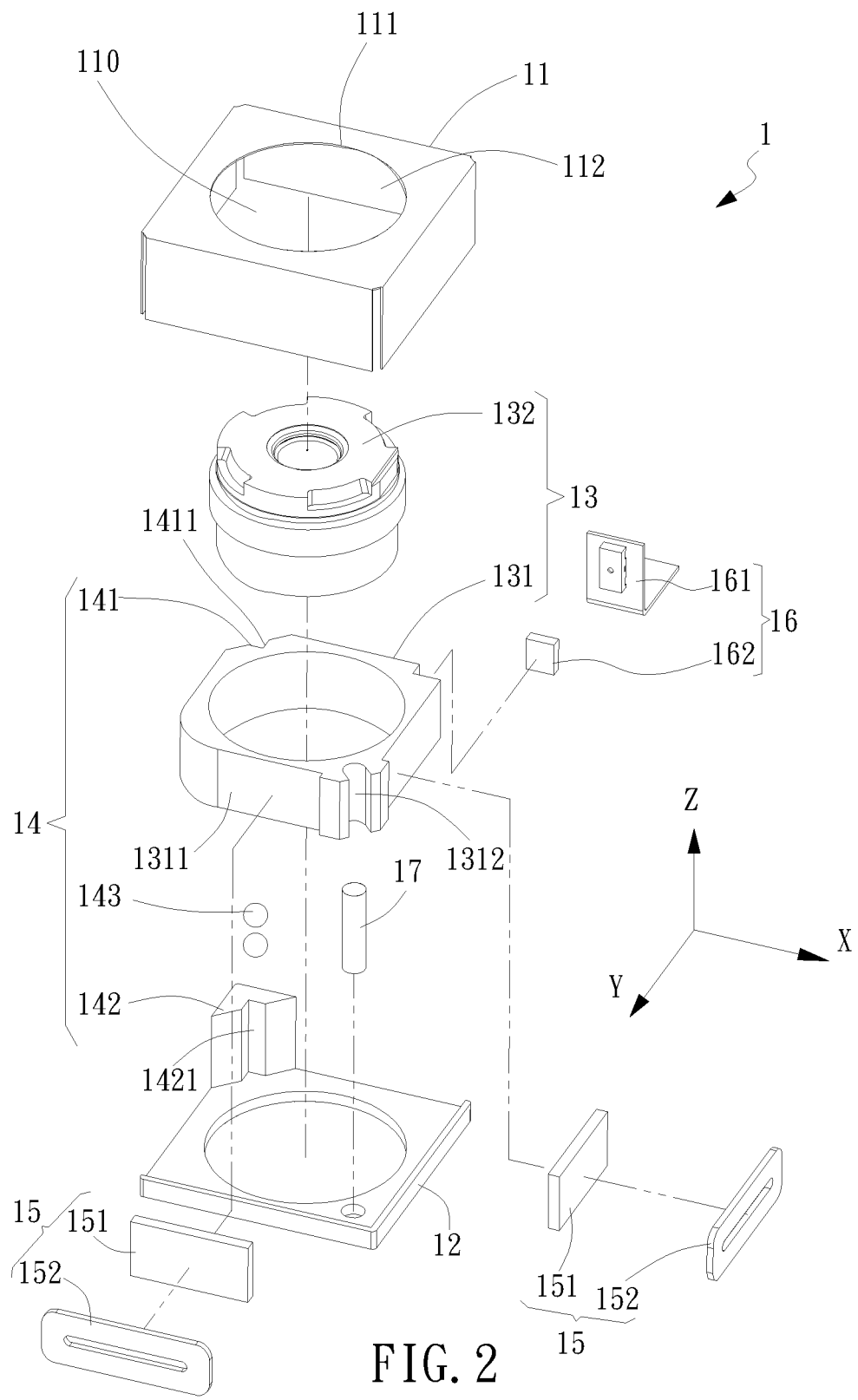
FIG. 2 is a schematic exploded view of a first embodiment of the electromagnetic driving device for lens having an anti-tilt mechanism in accordance with the present invention.
Figure 3:
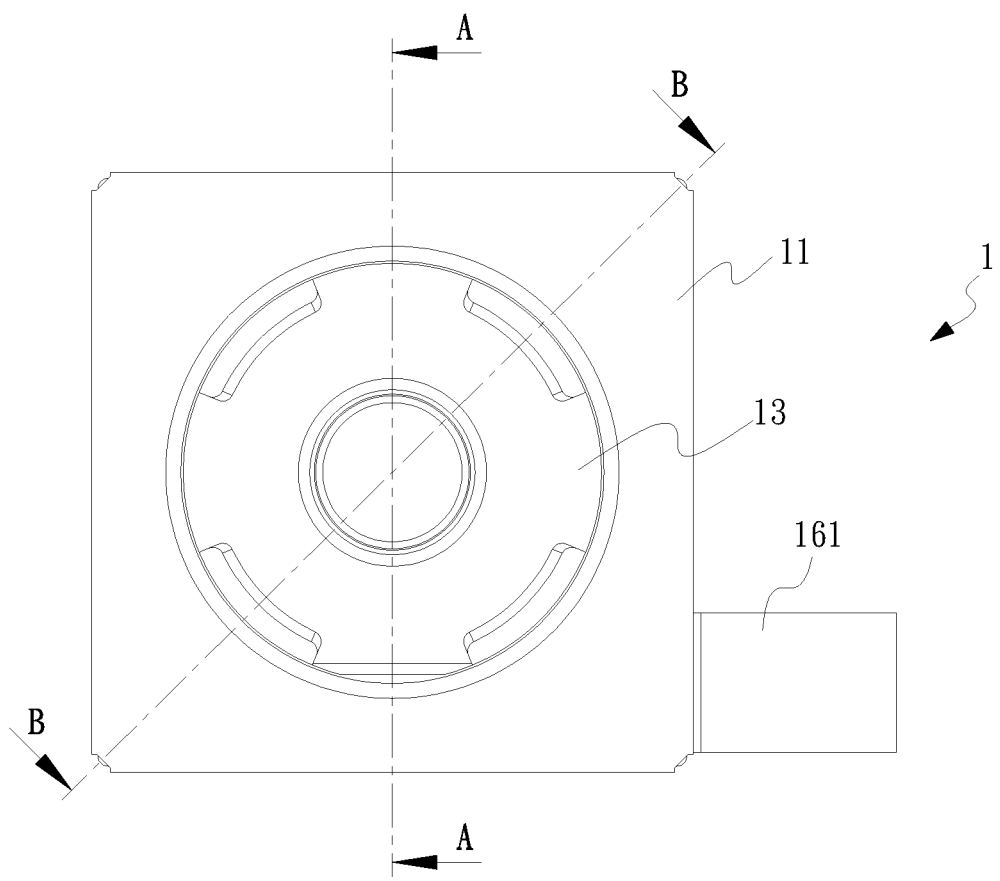
FIG. 3 is a top view of the electromagnetic driving device of FIG. 2.
Figure 4:
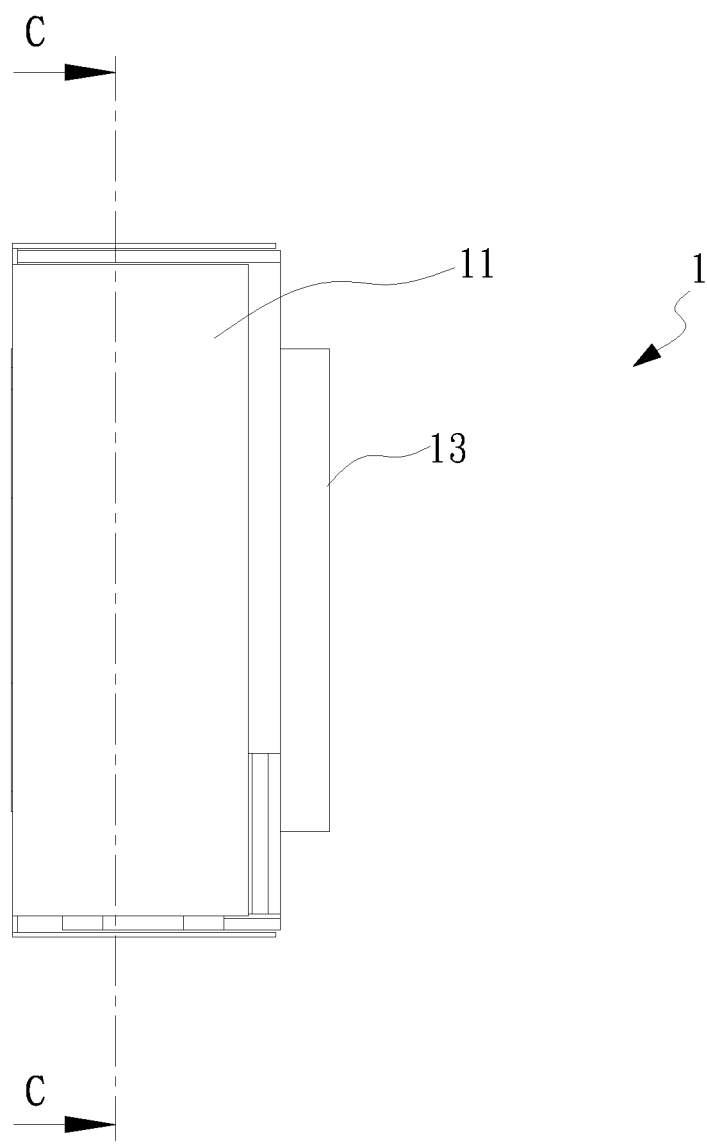
FIG. 4 is a left-hand side view of the electromagnetic driving device of FIG. 2.
Figure 5:
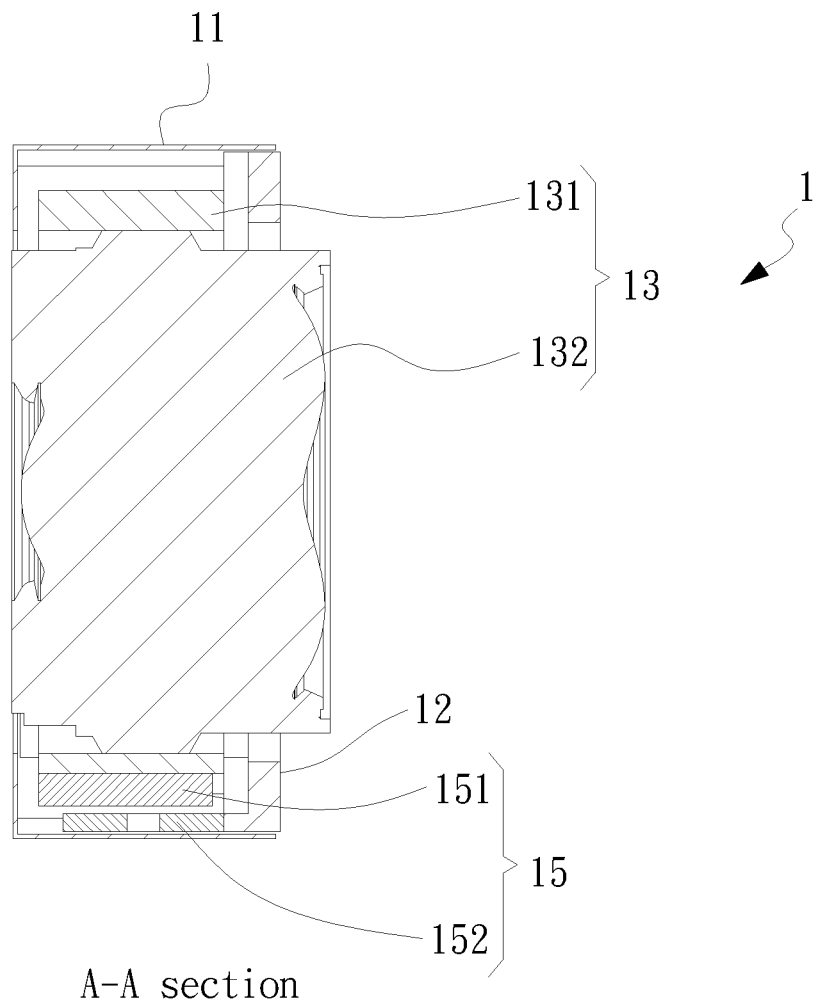
FIG. 5 is a schematic cross-sectional view of the electromagnetic driving device of FIG. 2 along line A-A.

Though two pairs of the magnetic member 151 and the coil 152 are shown in this first embodiment, it shall be understood that the number of pairs of the magnetic member 151 and the coil 152 can be three, four or more. Namely, multiple pairs of the magnetic member 151 and the coil 152 can exist between the exterior surface 1311 of the lens module 13 and the inner surface 112 of the casing 11. Also, in the first embodiment, the magnetic member 151 can be a permanent magnet, and the two pairs of the magnetic member 151 and the coil 152 are located to the exterior surface 1311 at positions close, in a manner of two side wings, to the guide mechanism 17. By providing two pairs of the magnetic member 151 and the coil 152 as shown in FIG. 2, the electromagnetic driving device 1 can waive the conventional magnetic Yoke design. Thereby, a further miniaturization upon the whole machinery can be possible, and the volume occupation can be further reduced. Also, the symmetrical arrangement of two pairs of the magnetic member 151 and the coil 152 with respect to the guide mechanism 17 contributes balanced forcing around the guide mechanism 17, such that the backlashes or spacing between contacting parts while the lens is in motion can be substantially reduced. As a result, tilt of the moving lens module 13 or any moving part can be reduced to a minimum.

In the present invention, the lens module 13 located inside the inner compartment 110 can carry out limited linear displacement without rotation, along the Z axis with the help of the guide mechanism 17 to keep the centerline of the lens module 13 parallel to the Z axis. As shown, the lens 132 of the lens module 13 can engage the lens carrier 131 at a center thereof, so as to perform synchronic movement with the lens carrier 131. Preferably, in the first embodiment, the guide mechanism 17 is a guide pin plugged in a predetermined guide slot 1312 of the lens carrier 131.

Further, the guide pin 17 can be made of a material mixed with a magnetic-conductive material such as an iron power. Also, the guide pin 17 can be a magnetic pin or a non-magnetic pin. In the case that the guide pin 17 is non-magnetic, the guide pin 17 can only provide a linear Z-axis motion guide for the lens module 13 and the lens carrier 131 inside the inner compartment 110 of the casing 11. On the other hand, while the guide pin 17 is magnetic, the guide pin 17 can serve both the aforesaid guiding purpose and another magnetic anti-tilt function. The magnetic anti-tilt function is achieved by utilizing the magnetic attraction of the two magnetic members 151 upon the guide pin 17 to form a pressure upon the lens module 13 to rotate upward around a direction parallel to the X-Y plane or to move closer horizontally to the guide pin 17. Upon such an arrangement, temporary X-axial or Y-axial spacing or backlashes formed between the lens module 13 and the guide pin 17 during the motion can be eliminated, and thus tilt of the lens module 13 can be diminished.

In the first embodiment of the present invention, the guide pin 17 located inside the inner compartment 110 provides opposing ends thereof to engage fixedly respectively with the casing 11 and the base 12 and is nested there-along inside the guide slot 1312 of the lens carrier 131 so as to act as an Z-axial guide track for the lens module 13 inside the inner compartment 110. In addition, the guide slot 1312 provides a curved surface thereof to contact the guide pin 17 so as to generate an appropriate friction in between. The magnitude of the friction can be controlled by the material of the guide pin 17 and/or the contact pressure between the guide slot 1312 and the guide pin 17. Upon such an arrangement, the guide pin 17 can successfully act as a Z-axial guide rack for the lens carrier 131 driven by the electromagnetic driving module 15 to perform a stable back-and-forth motion without rotation inside the inner compartment 110.

In the present invention, the coil 152 is to generate appropriate magnetic directions in response to the predetermined application currents thereupon. By providing the change of the electromagnetic field of the coil 152, the magnetic member 151 can thus be pushed or pulled so as to displace the lens carrier 131 a corresponding Z-axial movement inside the inner compartment 110. Thereby, the lens 132 inside the lens carrier 131 can then perform zooming and/or focusing according to the back-and-forth Z-axial motion inside the inner compartment 110.

Figure 6:
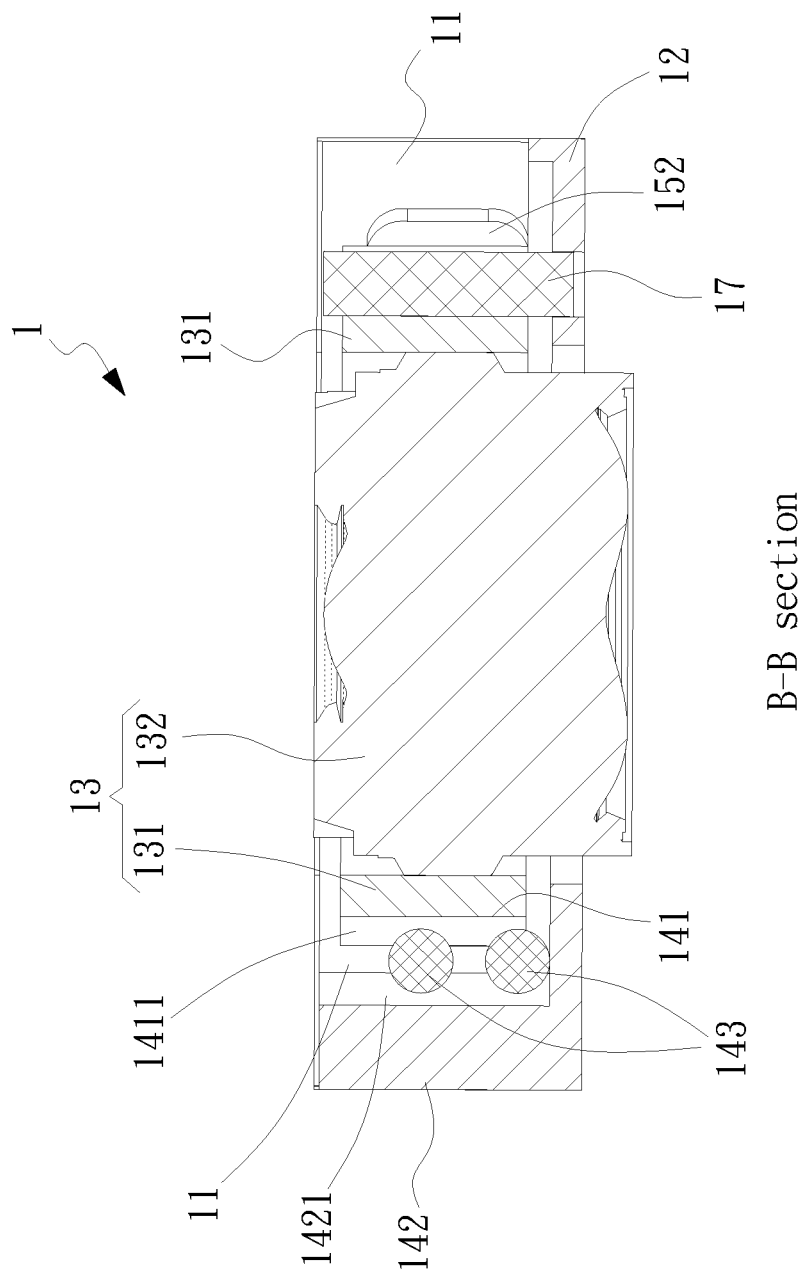
FIG. 6 is a schematic cross-sectional view of the electromagnetic driving device of FIG. 2 along line B-B.
Figure 7:
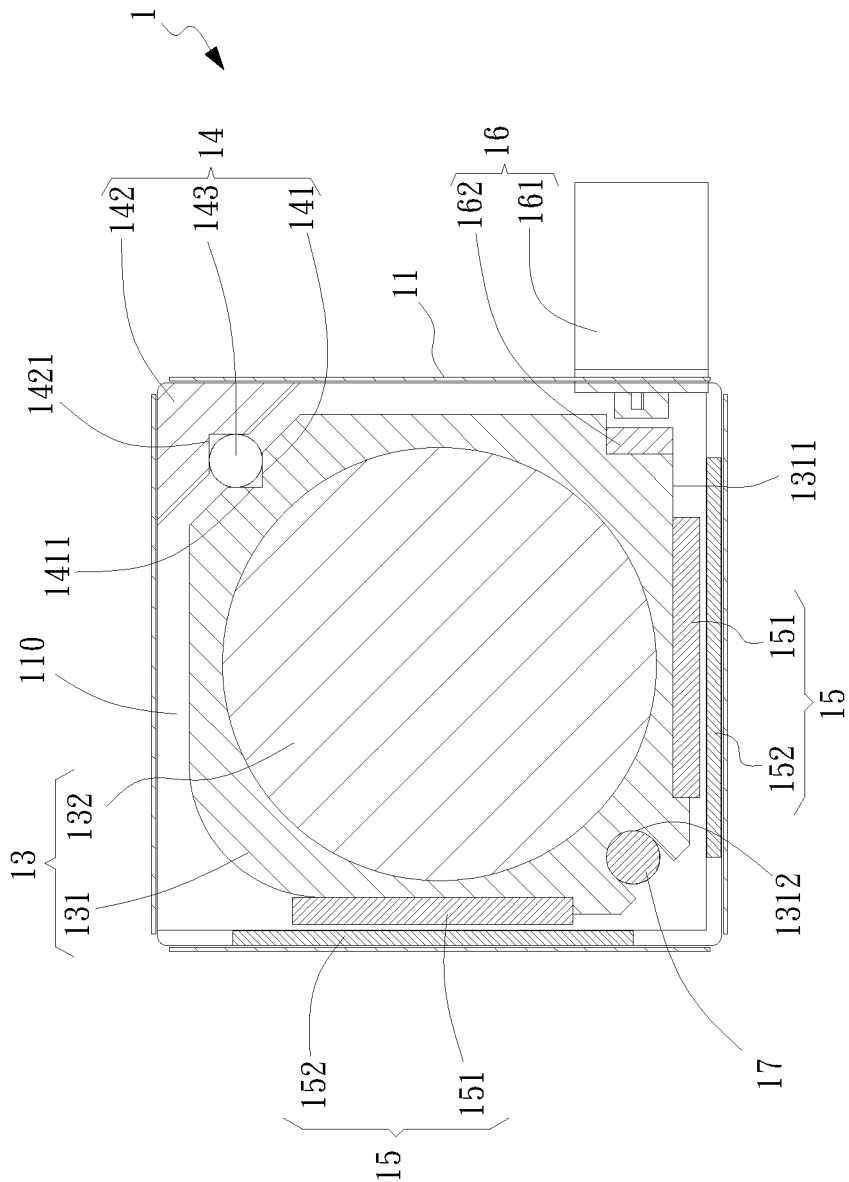
FIG. 7 is a schematic cross-sectional view of the electromagnetic driving device of FIG. 2 along line C-C.
Figure 8:
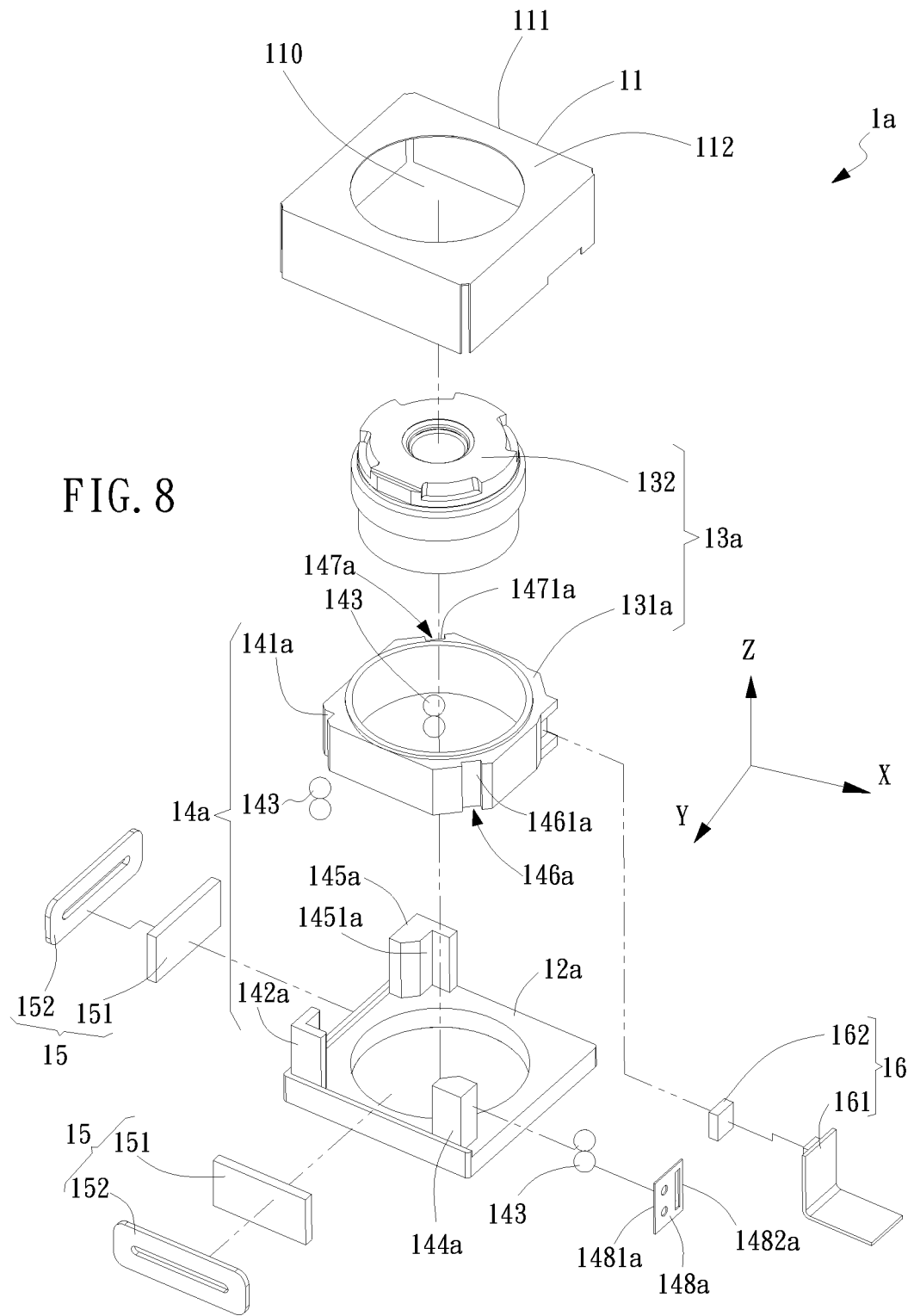
FIG. 8 is a schematic exploded view of a second embodiment of the electromagnetic driving device for lens having an anti-tilt mechanism in accordance with the present invention.
Figure 9:
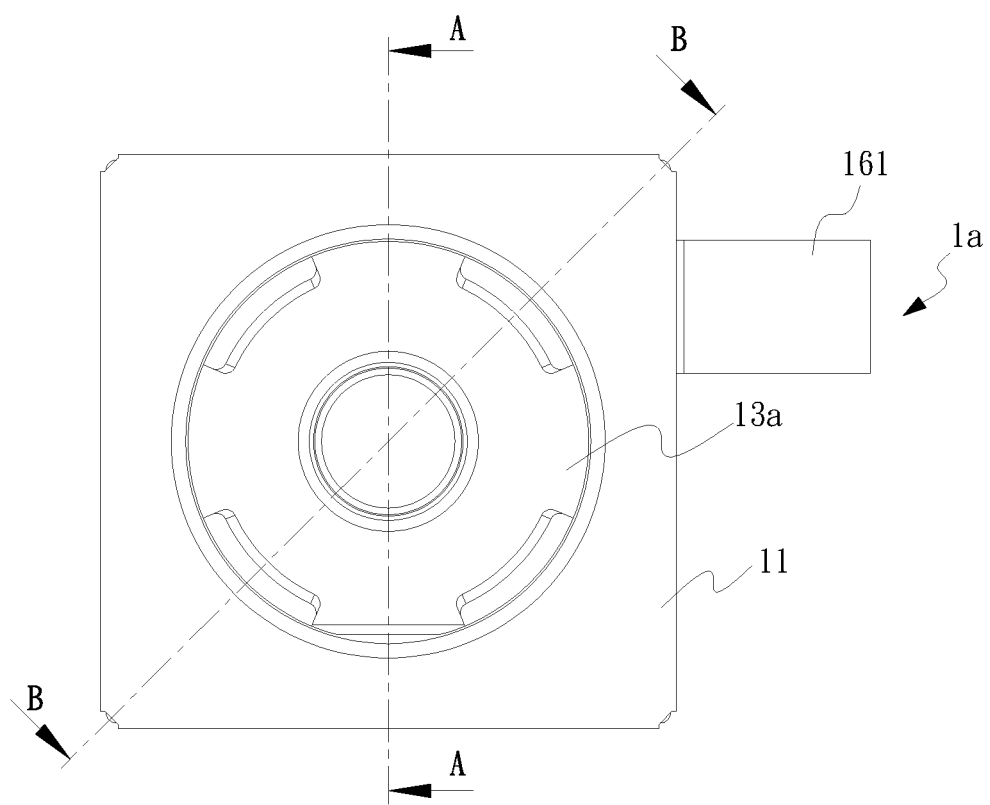
FIG. 9 is a top view of the electromagnetic driving device of FIG. 8.
Figure 10:
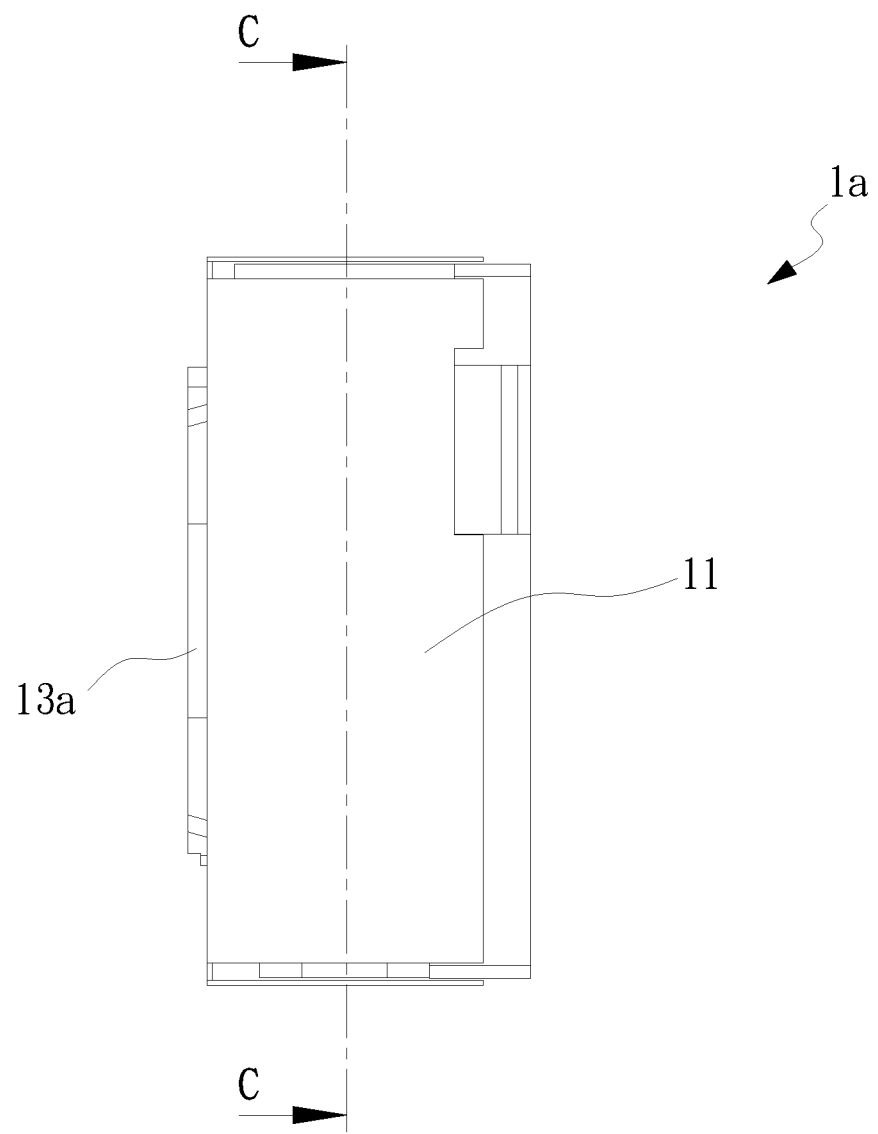
FIG. 10 is a left-hand side view of the electromagnetic driving device of FIG. 8.
Figure 11:
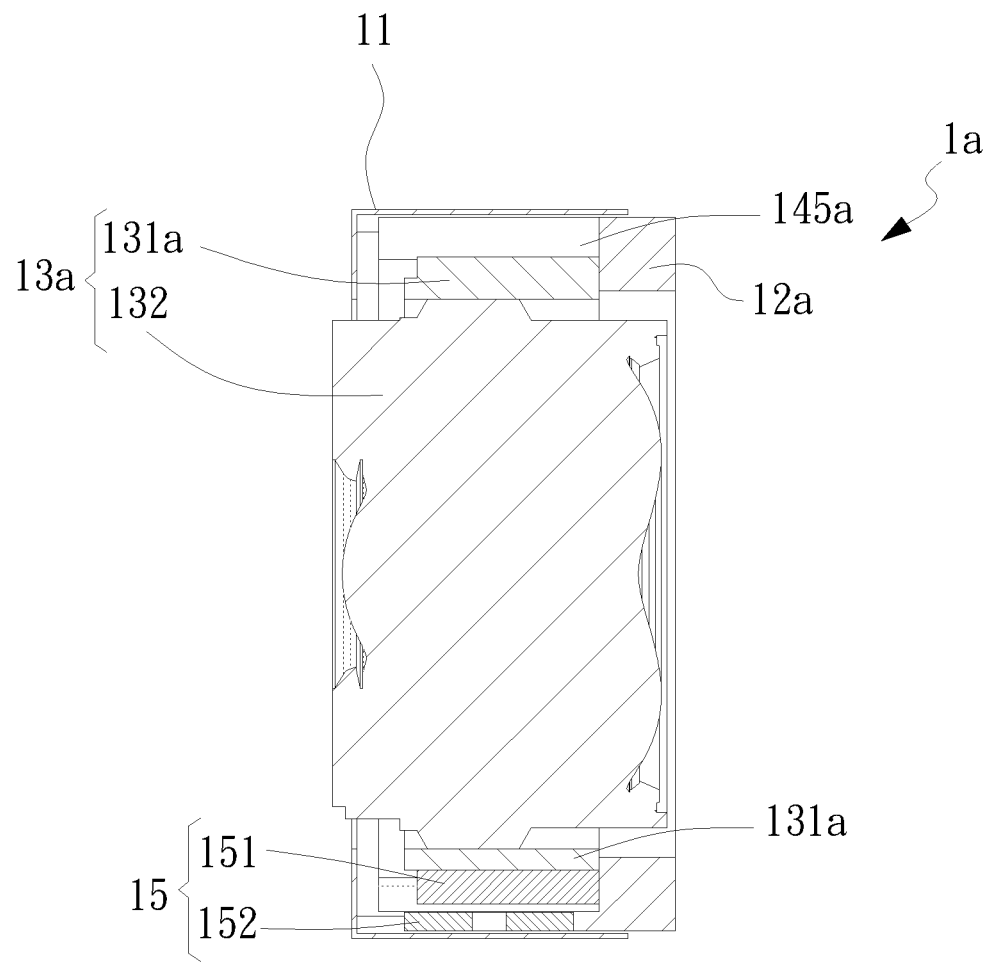
FIG. 11 is a schematic cross-sectional view of the electromagnetic driving device of FIG. 8 along line A-A.
Figure 12:
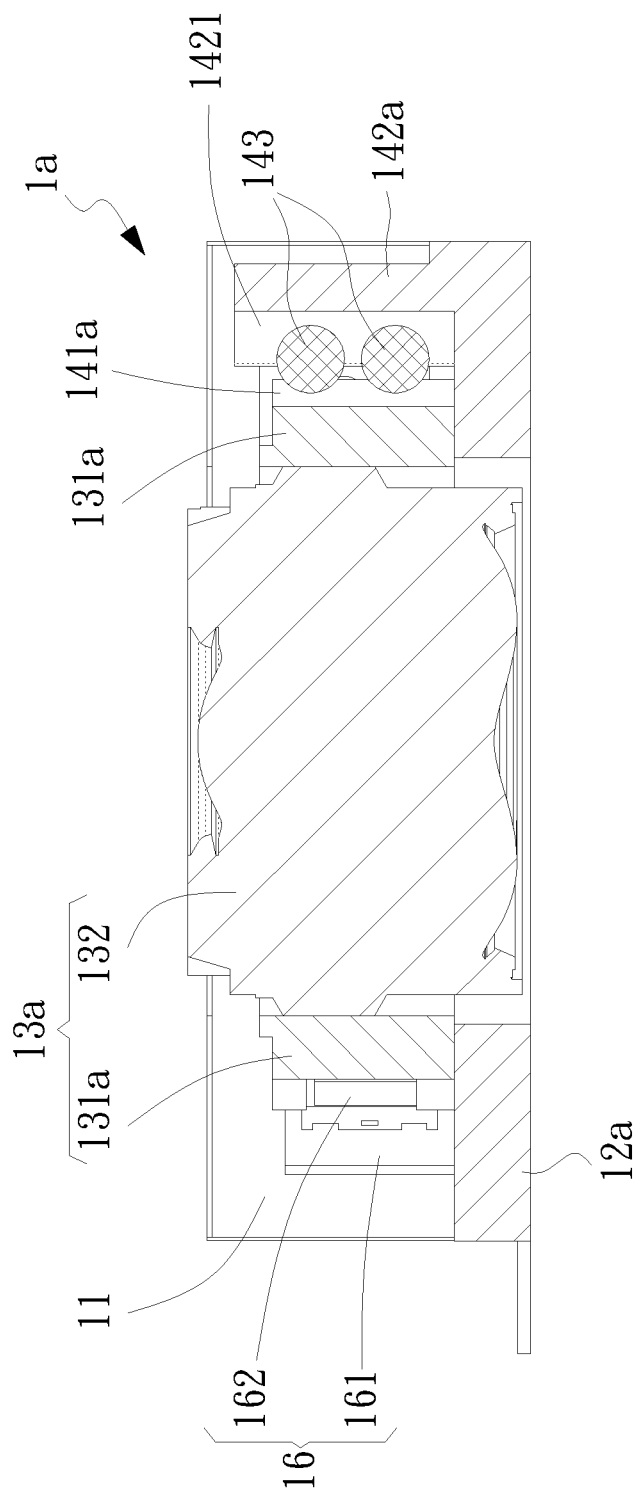
FIG. 12 is a schematic cross-sectional view of the electromagnetic driving device of FIG. 8 along line B-B.
Figure 13:
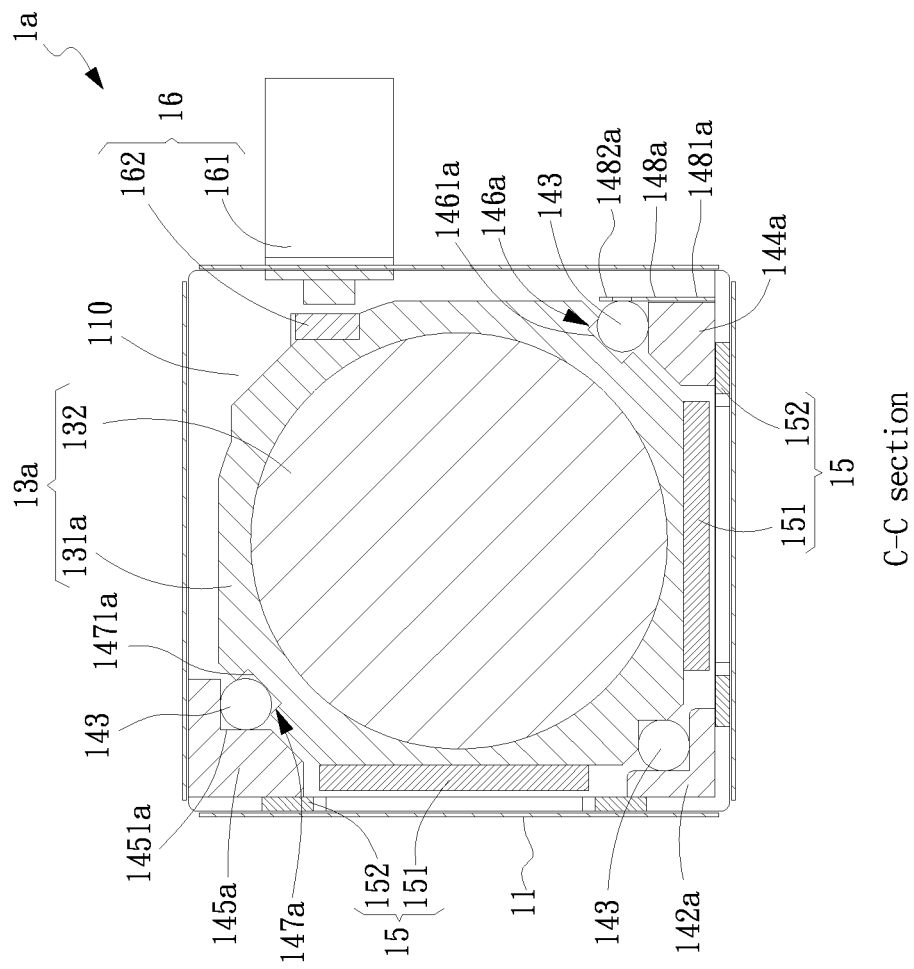
FIG. 13 is a schematic cross-sectional view of the electromagnetic driving device of FIG. 8 along line C-C.
Figure 14:
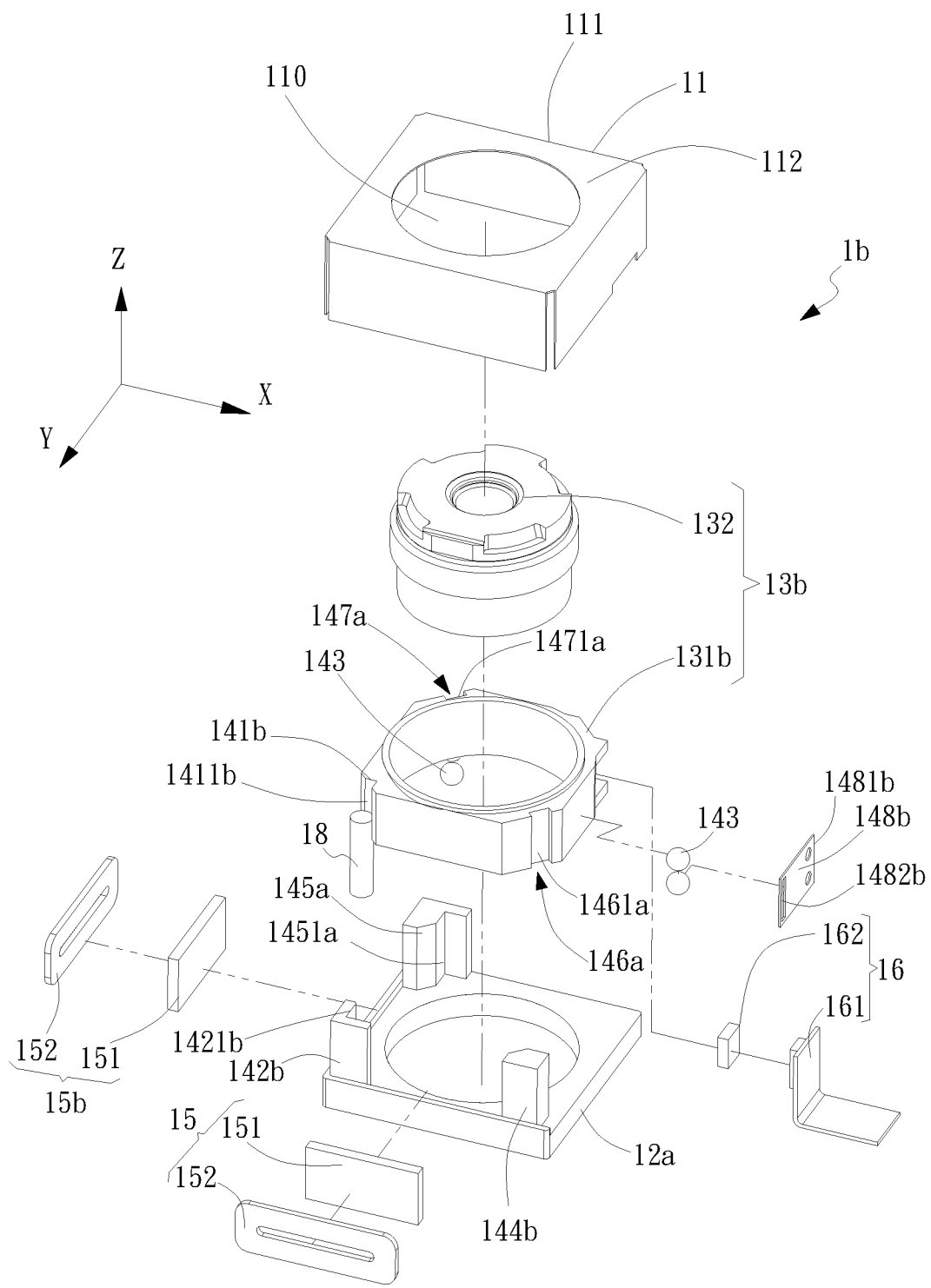
FIG. 14 is a schematic exploded view of a third embodiment of the electromagnetic driving device for lens having an anti-tilt mechanism in accordance with the present invention.
Figure 15:
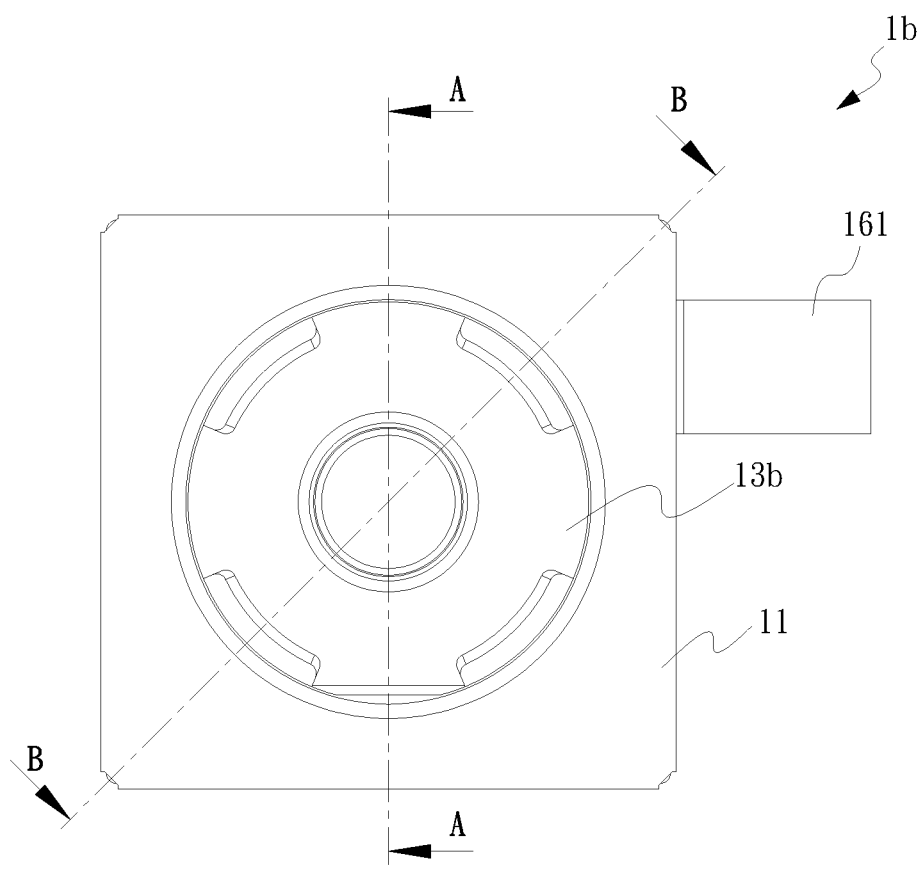
FIG. 15 is a top view of the electromagnetic driving device of FIG. 14.
Figure 16:
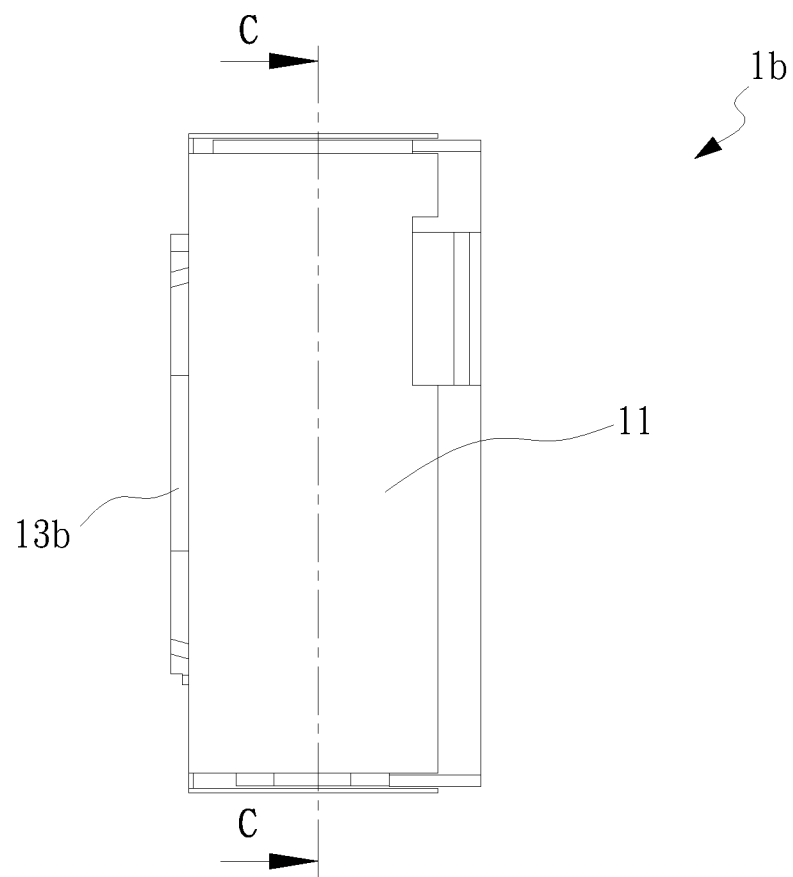
FIG. 16 is a left-hand side view of the electromagnetic driving device of FIG. 14.
Figure 17:
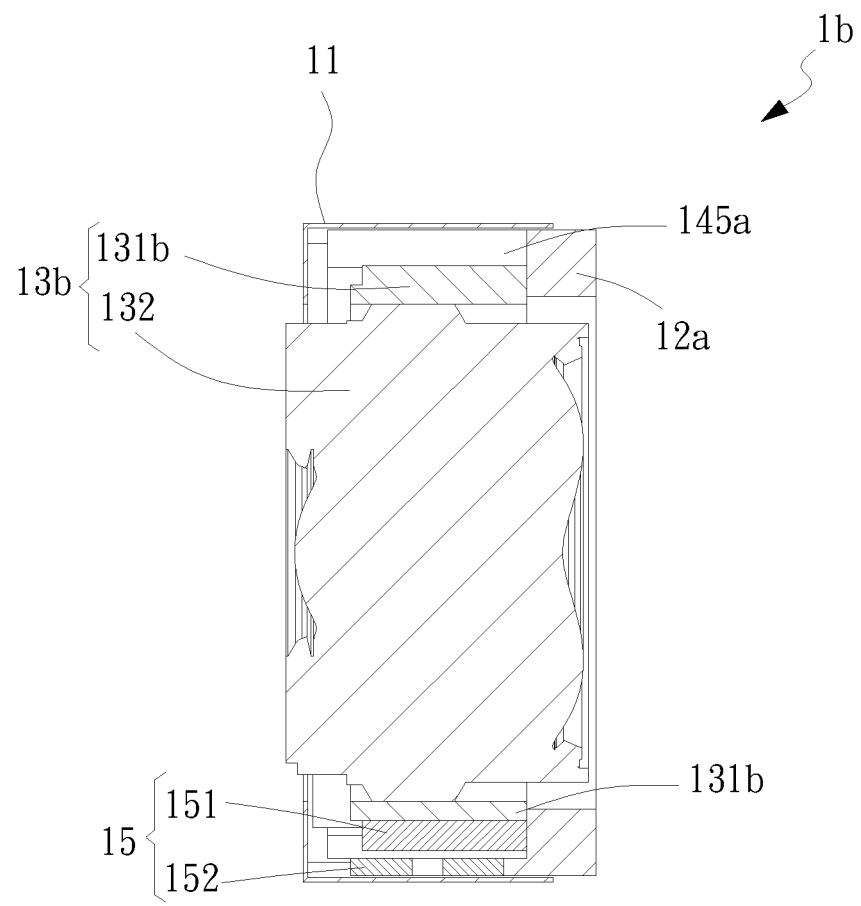
FIG. 17 is a schematic cross-sectional view of the electromagnetic driving device of FIG. 14 along line A-A.
Figure 18:
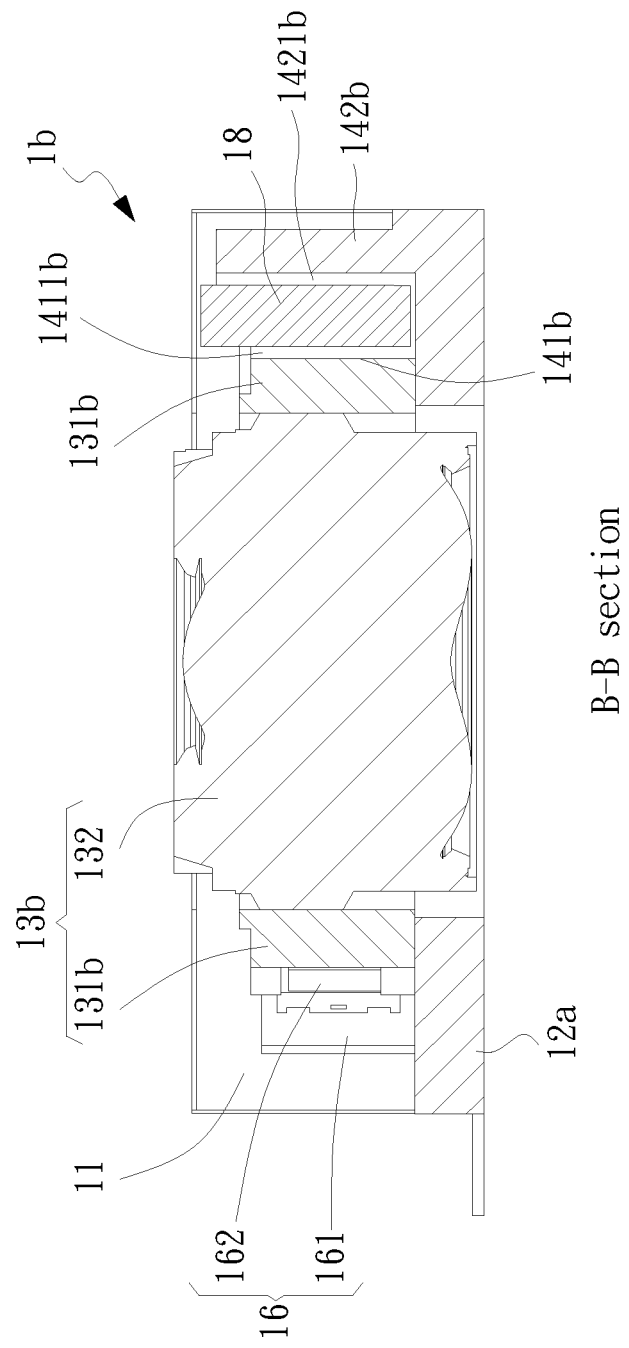
FIG. 18 is a schematic cross-sectional view of the electromagnetic driving device of FIG. 14 along line B-B.
Figure 19:
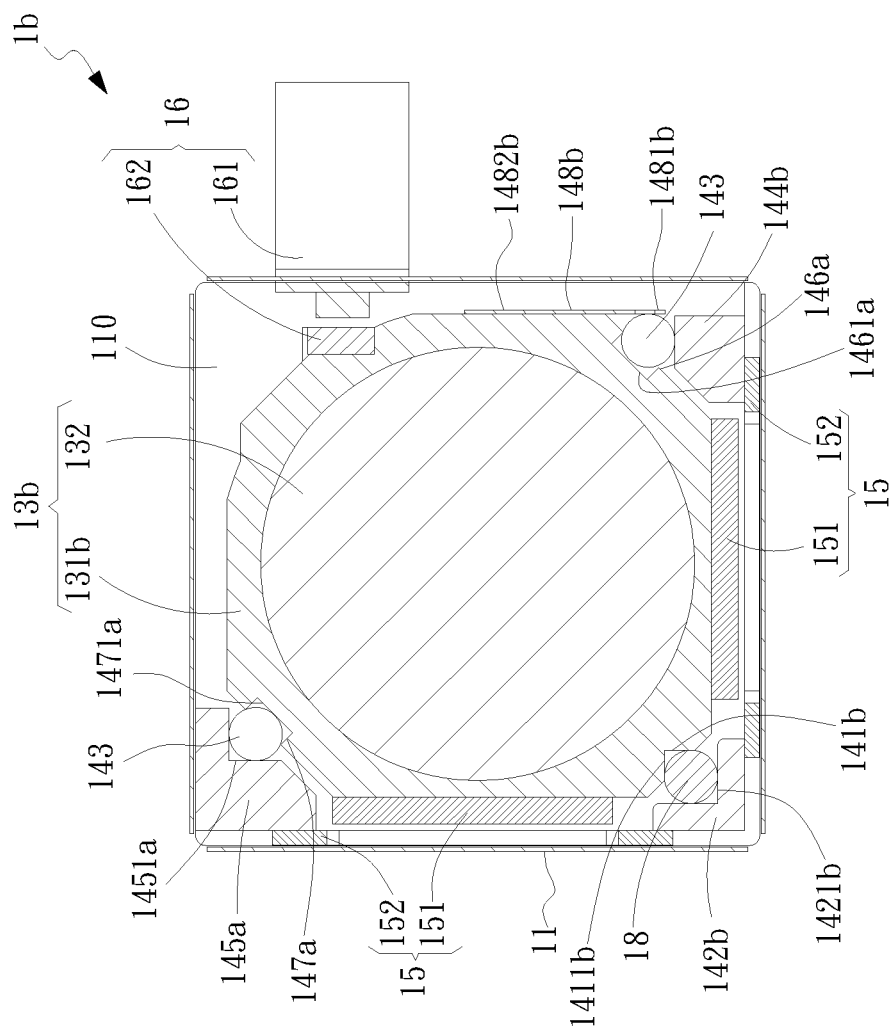
FIG. 19 is a schematic cross-sectional view of the electromagnetic driving device of FIG. 14 along line C-C.

As shown in FIG. 6 and FIG. 7, the first guide-groove 141 of the anti-tilt mechanism 14 can be a V-shape groove or a U-shape groove. The constraint block 142 integrally formed as a single piece with the base 12 is protruded upward and presents a V-shape cross section by the top view. Inside the constraint block 142, the V-shape second guide-groove (i.e., the V-shape inner contact surface 1421) is formed by respectively facing and accounting to the first guide-groove 141. By providing the rolling members 143 to roll in between the first guide-groove 141 and the constraint block 142, possible X-axial and/or Y-axial tilt generated, while the lens module 13 undergoes the Z-axial motion inside the inner compartment 110, can be thus substantially compensated, or preferably eliminated. In the first embodiment of the present invention, the rolling member 143 can include at least a rolling ball, at least a rolling pin, at least a cam, at least a slippery rod, or any the like that serves a frictional rolling purpose. Even more, the rolling member 143 can be at least two rolling balls, rolling pins, or cams. Hence, in the case that the first guide-groove 141 is formed as a V-shape groove, the rolling member 143 (rolling balls) can be restrained by clamping between the V-shape contact surface 1411 of the first guide-groove 141 and the respective concave V-shape contact surface 1421 of the constraint block 142, and thus the rolling member 143 can provide movement in between to compensate possible tilt of the lens module 13 generated from the Z-axial movement of the lens carrier 131 inside the inner compartment 110. Of course, in other embodiments of the present invention but not shown herein, the aforesaid V-shape contact surface 1411 or the respective V-shape contact surface 1421 can be alternatively formed as a concave U-shape, or any shape or structure that can serve a accommodation and guide purpose for the rolling member 143 of the present invention.

In the present invention, a gap between the guide slot 1312 and the guide pin 17 is inevitable for a manufacturer consideration not to form an unexpected friction or interference in between to hinder the movement of the lens carrier 131 along the guide pin 17. Yet, such a gap is also the reason leading to the formation of tilt while the lens carrier 131 moves along the guide pin 17. By providing the mechanism of the V-shape contact surface 1411 of the first guide-groove 141, the respective V-shape contact surface 1421 of the constraint block 142, and the rolling member 143 (rolling balls in this embodiment) in between, the induced rolling motion inside the mechanism can successfully compensate or preferably eliminate the gap variation from the rough surface, and also further eliminate actively possible tilt of the lens carrier 131 while in moving inside the inner compartment 110.

In the foregoing description, the existence of gap or spacing would cause minor oscillations of the lens carrier 131 while moving along the guide pin 17. Such the minor oscillations are the reasons for the so-called dynamic tilt (i.e., tilt in the previous description, and in the following description). The dynamic tilt or tilt would influence the angle between the lens module 13 and the image-detecting module located under the lens module 13. If the angle in between exceeds an acceptable value, the optical imaging will be degraded; in particular, for those apparatuses with high-resolution (i.e., high pixel values). Preferably, to meet the high pixel value requirement, the acceptable angle tolerance between the lens module 13 and the image-detecting module is within 10 arc minutes (1 degree=60 arc minutes). Conventionally, the tilt angle can only be controlled to a value around 10 arc minutes (0.167 degree). Obviously, by applying the electromagnetic driving device for lens having an anti-tilt mechanism in accordance with the present invention, the motional tilt angle between the lens module 13 and the image-detecting module can be controlled to a value below 6 arc minutes (i.e., 0.1 degree). Accordingly, the influence of the tilt upon the imaging can be substantially reduced, and thus the imaging-detecting module can better perform the image-capturing.

In the following description, two more embodiments of the present invention are present. For most of the elements of the following embodiments are resembled to those of the first embodiment as described above, the same names and numbers would be directly assigned to those elements that have been described in the first embodiment. For those elements of the following two embodiments that are slightly different to the corresponding elements in the first embodiment, a tailing English letter will be added to the respective numbers though the same names and numbers are still given. Details for those elements of the following two embodiments that are totally resembled to or slightly different to the corresponding elements in the first embodiment are omitted herein.

Referring now to FIG. 8, FIG. 9, FIG. 10, FIG. 11, FIG. 12 and FIG. 13, an exploded view, a top view, a left-hand side view, a cross-sectional view along line A-A, a cross-sectional view along line B-B and a cross-sectional view along line C-C of a second embodiment of the electromagnetic driving device for lens having an anti-tilt mechanism are shown, respectively. By comparing FIG. 8 to FIG. 2, it is shown that the second embodiment is almost the same as the first embodiment, and thus elements of the second embodiment which are the same as those of the first embodiment would be omitted herein. Differences between the first embodiment of FIG. 2-FIG. 7 and the second embodiment of FIG. 8-FIG. 13 are elucidated as follows.

The second embodiment 1a of the electromagnetic driving device for lens having an anti-tilt mechanism according to the present invention has a lens carrier 131a without the guide slot 1312 for nesting the guide mechanism 17. In addition, in this second embodiment 1a, a second constraint block 144a and a third constraint block 145a are built to stand at respective sides of the constraint block 142a of the base 12a so as to form a three-point support to replace the pair of the guide mechanism 17 and the guide slot 1312 in the first embodiment. Upon such an arrangement, the lens module 13a can be located inside the inner compartment 110 through the solid support and thus constraint of the constraint block 142a, the second constraint block 144a and the third constraint block 145a on the base 12a. Further, also with the guide structure formed by the constraint block 142a, the second constraint block 144a and the third constraint block 145a, the lens module 13a can perform the back-and-forth Z-axial motion inside the space defined by the three constraint blocks 142a, 144a and 145a. furthermore, in the second embodiment 1a, by providing the three constraint blocks 142a, 144a and 145a, besides the tree-point support is established, a possibility of precision calibration upon the gaps between the lens module 13a and the base 12a at both the X-direction and the Y-direction can be introduced to further reduce the motional tilt in between.

The anti-tilt mechanism 14a of the second embodiment is to provide a lateral push or pull to a place around a corner of the driven object 13a so as to force the lens module 13a (the driven object) to rotate upward along the Z axis on an X-Y plane, thereby the X-axial and/or Y-axial gap, backlash or spacing around the lens module 13a inside the compartment 110 can be eliminated, and thus the anti-tilt purpose is properly achieved. As shown, the anti-tilt mechanism 14a further includes a preset spring member 148a. In the second embodiment 1a, the preset spring member 148a is an elastic metal spring plate having one lateral side 1481a (the fixed end) fixed to the second constraint block 144a of the base 12a and another lateral side 1482a (the elastic end) elastically pressing the rolling member 143 onto the lens carrier 131a and the second constraint block 144a. Further, respectively in positions to the second constraint block 144a and the third constraint block 145a, the rim of the lens carrier 131a further has a third guide-groove 146a and a forth guide-groove 147a. The third guide-groove 146a and the forth guide-groove 147a are constructed as individual U-shape guide-grooves to provide respective U-shape contact surfaces 1461a and 1471a. The third constraint block 145a has a third V-shape contact surface 1451a to pair the U-shape contact surface 1471a at the corresponding rim of the lens carrier 131a for accommodating the rolling members 143 to form a non-slipping roller pair. The combination of the third constraint block 145a, the rolling members 143 and the U-shape contact surface 1471a associates the combination of the constraint block 142a, the rolling members 143 and the first guide-groove 141a to form the linear guide rack mechanism for the lens module 13a to slide along the Z axis.

Further, in the second embodiment 1a, the second constraint block 144a is located laterally to the U-shape contact surface 1461a of the third guide-groove 146a so as to serve a fixation purpose for the preset spring member 148a, and the second constraint block 144a can elastically force the rolling member 143 onto the U-shape contact surface 1461a via the elastic end 1482a of the preset spring member 148a and also further presses, in an indirect way across the lens carrier 131a, the opposing rolling member 143 onto the second constraint block 145a. Upon such an arrangement, in the inner compartment 110, the lens module 13a can be hold with a controllable loading onto the guide rack mechanism formed by the constraint block 142a and the third constraint block 145a. Namely, the contact states, not the fixation states, prevail in the lens module 13a among the lens carrier 131a, the rolling member 143 and the preset spring member 148a. In particular, besides pre-forcing the rolling member 143, the elastic end 1482a induces a friction that obstacles the sliding of the lens module 13a inside the inner compartment 110, and also maintains the X-axial and the Y-axial tolerances of the lens module 13a under a circumstance of not interfering the Z-axial sliding of the lens module 13a. Thereby, the gap inducing the dynamic tilt during the motion of the lens module 13a can be reduced to a minimum.

Referring now to FIG. 14, FIG. 15, FIG. 16, FIG. 17, FIG. 18 and FIG. 19, an exploded view, a top view, a left-hand side view, a cross-sectional view along line A-A, a cross-sectional view along line B-B and a cross-sectional view along line C-C of a third embodiment of the electromagnetic driving device for lens having an anti-tilt mechanism are shown, respectively. By comparing FIG. 14 to FIG. 8, it is shown that the third embodiment is almost resembled to the second embodiment, and thus elements of the third embodiment which are the same as those of the second embodiment would be omitted herein. Differences between the second embodiment 1a of FIG. 8-FIG. 13 and the third embodiment 1b of FIG. 14-FIG. 19 are elucidated as follows.

In the third embodiment 1b, a friction guide pin 18 is received inside the slender slot space formed by the constraint block 142b and the first guide-groove 141b. The combination of the constraint block 142b, the first guide-groove 141b and the friction guide pin 18 is one of the sliding guide for the lens module 13b to slide along the Z axis inside the inner compartment 110. Preferably, the friction guide pin 18 can be a round rod to replace the respective rolling member 143 of the second embodiment 1a. Besides the guiding function for the lens module 13b, the friction guide pin 18 can also provide the lens module 13b a relevant friction while the lens module 13b is moving inside the inner compartment 110. In addition, in the case that the friction guide pin 18 is made of a magnetic material, an additional magnetic anti-tilt function can be achieved. The magnetic anti-tilt function is to utilize the magnetic attraction of the two magnetic members 151 located exteriorly to the lens carrier 131b upon the adjacent friction guide pin 18 to form a pressure for forcing the friction guide pin 18 onto the V-shape contact surface 1411b of the first guide-groove 141b. Namely, by providing the magnetic attraction, the lens module 13b can be pushed closely to the friction guide pin 18 at a direction parallel to the X-Y plane. Upon such an arrangement, temporary X-axial or Y-axial spacing or backlashes formed between the lens module 13b and the friction guide pin 18 during the motion can be eliminated, and thus tilt of the lens module 13b can be diminished.

Further, the fixed end 1481b of the preset spring member 148b is mounted fixedly to the rim 1311b of the lens carrier 131b, while the elastic end 1482b elastically presses the rolling member 143 (rolling balls) to contact the lens carrier 131b and the second constraint block 144b. Namely, it is the contact state, not the fixation state, to exist in the lens module 13b among the lens carrier 131b, the rolling member 143 and the preset spring member 148b. A major difference in the preset spring member between the second embodiment 1a and the third embodiment 1b is that the fixed end 1481b of the preset spring member 148b is fixed to the lens carrier 131b in the third embodiment 1b, such that the fixed end 1481b as well as the preset spring member 148b and also the rolling member 143 would be moved by the lens carrier 131b. Practically, while the lens module 131b is shifted along the Z axis, the preset spring member 148b is also pushed or pulled at the fixed end 1481b, so that the rolling member 143 is pressed to act against possible tilt of the lens module 13b at the X-axial and/or Y-axial direction. In the third embodiment 1b, the preset spring member 148b of the anti-tilt mechanism 14b can provide a lateral push or pull to a place around a corner of the lens module 13b (the driven object) so as to minimize the gaps at the forcing direction and further to force the lens module 13b to rotate upward along the Z axis on an X-Y plane. Thereby, the X-axial and/or Y-axial gap, backlash or spacing around the lens module 13b inside the inner compartment 110 can be relevantly compensated, and then the anti-tilt purpose can be properly achieved.

In summary of all the three aforesaid embodiments 1, 1a and 1b according to the present invention, the electromagnetic driving device for lens having an anti-tilt mechanism, defined with an X-Y-Z coordinate system, includes a casing 11, a base 12, a driven object 13, an anti-tilt mechanism 14 and an electromagnetic driving module 15. The electromagnetic driving module 15 further includes a plurality of magnetic members 151 and a plurality of coils 152. An inner compartment 110 is formed between the base 12 and the engaged casing 11 so as to allow the lens module 13 (the driven object) to displace thereinside along the Z axis. The magnetic member 151 fixed at the driven object 13 and the respective coil 152 fixed at the casing 11 are paired to generate electromagnetic forcing to drive the driven object 13. The anti-tilt mechanism 14 is introduced to eliminate the dynamic tilt, which might be induced by the X-axial and/or Y-axial gap while the driven object 13 is moving along the Z axis inside the inner compartment 110.

While the present invention has been particularly shown and described with reference to a preferred embodiment, it will be understood by those skilled in the art that various changes in form and detail may be without departing from the spirit and scope of the present invention.

What is claimed is:

1. An electromagnetic driving device for lens having an anti-tilt mechanism, defined with an X axis, a Y axis and a Z axis, comprising:
    a casing;
    a base, connected the casing to form an inner compartment in between;
    a driven object, received inside the inner compartment, allowed to displace in the casing along the Z axis;
    an anti-tilt mechanism for eliminating X-axial or Y-axial gaps around the driven object inside the inner compartment; and
    an electromagnetic driving module, further including at least one magnetic member and at least one coil, said at least one magnetic member located at the driven object being positioned respectively to said at least one coil located at the casing;
    wherein, by utilizing said at least one coil and said at least one magnetic member, the driven object is electromagnetically driven to displace inside the inner compartment along the Z axis;
    wherein, while the driven object is moving, the anti-tilt mechanism is to eliminate dynamic tilt of the driven object;
    wherein said anti-tilt mechanism further includes a first guide-groove located at a rim of said driven object, a constraint block protruded from said base, and a rolling member, the rolling member being received inside a space formed by the first guide-groove and a central portion of the constraint block, both the first guide-groove and the constraint block being extended in a direction parallel to said Z axis.

2. The electromagnetic driving device for lens having an anti-tilt mechanism according to claim 1, wherein said first guide-groove is one of a V-shape first guide-groove and a U-shape first guide-groove, said constraint block is a V-shape constraint having a V-shape second guide-groove respectively facing said first guide-groove, and said rolling member is one of the at least one rolling ball, at least one rolling pin, at least one slippery rod and at least one cam.

3. The electromagnetic driving device for lens having an anti-tilt mechanism according to claim 1, further including a guide mechanism for guiding said driven object inside said inner compartment, the guide mechanism further having at least a guide pin;
    wherein, in the case that the guide pin is non-magnetic, the guide pin provides only a linear motion guide for said driven object inside said inner compartment (i.e., a guiding purpose);
    wherein, in the case that the guide pin is magnetic, the guide pin serves both the guiding purpose and another magnetic anti-tilt function which is achieved by utilizing magnetic attraction of said at least one magnetic member upon the guide pin to form a pressure upon said lens module to rotate upward around a direction parallel to an X-Y plane or to move closer horizontally to the guide pin.

4. The electromagnetic driving device for lens having an anti-tilt mechanism according to claim 1, wherein said at least one magnetic member is a magnet.

5. The electromagnetic driving device for lens having an anti-tilt mechanism according to claim 1, wherein said driven object is a lens module further having a lens carrier and a lens, the lens being located at a center of the lens carrier and moved synchronically with the lens carrier.

6. The electromagnetic driving device for lens having an anti-tilt mechanism according to claim 5, further including a position-detecting module for detecting a displacement of the driven object inside the inner compartment.

7. The electromagnetic driving device for lens having an anti-tilt mechanism according to claim 5, wherein said position-detecting module includes a position detector and a permanent magnet, the position detector being mounted to said casing at a position with respect to the permanent magnet engaged exteriorly with said lens carrier.

8. The electromagnetic driving device for lens having an anti-tilt mechanism according to claim 5, wherein said at least one magnetic member includes two magnetic members and said at least one coil includes two coils, the two magnetic members being mounted individually exteriorly to said lens carrier at positions facing the respective coils mounted at said casing.

9. The electromagnetic driving device for lens having an anti-tilt mechanism according to claim 2, wherein said anti-tilt mechanism further includes a preset spring member further having one fixed end fixed to said constraint block of said base and another elastic end elastically pressing said rolling member to contact said driven object.

10. The electromagnetic driving device for lens having an anti-tilt mechanism according to claim 9, wherein said another elastic end of said preset spring member also contacts said constraint block.

11. The electromagnetic driving device for lens having an anti-tilt mechanism according to claim 2, wherein said anti-tilt mechanism further includes a preset spring member further having one fixed end fixed to said driven object and another elastic end elastically pressing said rolling member onto said constraint block.

12. The electromagnetic driving device for lens having an anti-tilt mechanism according to claim 11, wherein said another elastic end of said preset spring member also contacts said driven object.

* * * * *